United States Patent
Toyama et al.

(10) Patent No.: US 11,472,937 B2
(45) Date of Patent: Oct. 18, 2022

(54) METHOD FOR DEGRADING RESIN MOLDED BODY AND DEGRADABLE RESIN PRODUCT

(71) Applicant: P-Life Japan Inc., Tokyo (JP)

(72) Inventors: Isao Toyama, Tokyo (JP); Claudio Augusto Fernandez Preciado, Guadalajara (MX)

(73) Assignee: P-Life Japan Inc., Tokyo (JP)

( * ) Notice: Subject to any disclaimer, the term of this patent is extended or adjusted under 35 U.S.C. 154(b) by 125 days.

(21) Appl. No.: 17/043,911

(22) PCT Filed: Apr. 27, 2018

(86) PCT No.: PCT/JP2018/017132
§ 371 (c)(1),
(2) Date: Sep. 30, 2020

(87) PCT Pub. No.: WO2019/207751
PCT Pub. Date: Oct. 31, 2019

(65) Prior Publication Data
US 2021/0017355 A1    Jan. 21, 2021

(51) Int. Cl.
*C08J 11/26* (2006.01)
*C08J 7/14* (2006.01)

(52) U.S. Cl.
CPC .......... *C08J 11/26* (2013.01); *C08J 7/14* (2013.01); *C08J 2323/06* (2013.01)

(58) Field of Classification Search
USPC .......................................................... 521/47
See application file for complete search history.

(56) References Cited

U.S. PATENT DOCUMENTS

| 5,306,772 A * | 4/1994 | Mimura | C08L 59/00 |
| | | | 525/154 |
| 2002/0004545 A1* | 1/2002 | Tanigawa | C08K 5/098 |
| | | | 524/394 |

FOREIGN PATENT DOCUMENTS

| JP | H08509750 A | 10/1996 |
| JP | 2001294761 A | 10/2001 |
| JP | 2002235013 A | 8/2002 |
| JP | 2002542313 A | 12/2002 |
| JP | 200568313 A | 3/2005 |
| JP | 2014198331 A | 10/2014 |

OTHER PUBLICATIONS

International Search Report dated Oct. 16, 2018 in corresponding International application No. PCT/JP2018/017132; 7 pages.
Notification of Reasons for Refusal dated Jun. 23, 2020 of corresponding Japanese application No. 2019-520768; 8 pages.

* cited by examiner

*Primary Examiner* — Terressa Boykin
(74) *Attorney, Agent, or Firm* — Maier & Maier, PLLC (57) ABSTRACT

Thermoplastic resin, especially in resin moldings whose main raw material is polyolefin-based resin, does not impair mechanical strength, water resistance, chemical resistance at the time of production, and does not require specific disposal means. Provided are a method for decomposing a resin molded body capable of decomposing a body and a degradable resin product. Decomposition treatment of a resin molded body that includes decomposing a resin molded body by applying a decomposition treatment liquid containing a plurality of fatty acid metal salts having different oxidation numbers by any method of coating, spraying, spraying or dipping a degradable resin product to which the decomposition treatment method is applied.

11 Claims, 5 Drawing Sheets

FIG.4B

METHOD FOR DEGRADING RESIN MOLDED BODY AND DEGRADABLE RESIN PRODUCT

TECHNICAL FIELD

This invention relates to a method for decomposing a resin molded body and to a degradable resin product.

BACKGROUND

For example, thermoplastic resins are preferably used in synthetic resin products such as films/sheets, packaging containers, and machine parts from the viewpoint of physical properties such as mechanical strength, water resistance, and chemical resistance. Among the thermoplastic resins, these resins classified into so-called olefin resins such as polyethylene and polypropylene, account for about 40% or more of the total annual resin production, and are widely used in various fields regardless of the primary industries such as agriculture and fisheries as well as the secondary industry such as construction industry, and the manufacturing industry.

For example, agricultural mulch films are used in preventing the water retention, fertilizer retention, and weeds of the field, and many of them contain polyethylene as a main raw material. Agricultural mulch films contribute to the growth of crops due to their excellent physical properties, such as their mechanical strength and water resistance; however, when their harvesting is completed and their purpose is achieved, those mulch films are manually removed from the harvested agricultural farm. For aged agricultural farmers, a large labor burden is likely imposed, and these mulch films are discarded as an industrial waste for a fee, so that an economical burden on each farmer is large. There is also a method to recycle the discarded mulch film, but it requires a large-scale and expensive device, and since it is difficult to wash all components such as soil, recycling to the agricultural mulch films is currently not available. In addition, even if collected and incinerated, there is a large risk that harmful smoke will be generated due to impurities attached to the mulch films. It is therefore clear that there is a great demand for mulch films rapidly decomposed in the natural environment after the harvest of agricultural products.

In view of such a situation, for example, in Japanese Patent Laid-Open No. 2001-294761, disclosed is a method for producing a synthetic resin product, which can be decomposed without producing toxic and dangerous substances without taking any disposal means otherwise generating pollution or environmental damages, such as embedding in soil or incinerating, e.g., unnecessary daily necessities, furniture, or synthetic resin products in all fields.

SUMMARY

The technique described in Patent Document 1 is for molding a synthetic resin product by adding a synthetic resin material decomposing component to the synthetic resin material in the product manufacturing process. The synthetic resin material decomposition component is said to be composed of a direct biodegradation component for the thermoplastic resin, an oxidizable component, a transition metal component, and a non-metal stabilizing component, and the decomposition initiation of the thermoplastic resin is controlled by a non-metal stabilizing component consisting of hindered phenols.

However, the non-metal stabilizing component that delays the start of the decomposition process of the thermoplastic resin is added in the product manufacturing process, and it is difficult to strictly control the decomposition start timing of the thermoplastic resin. Further, since it is necessary to add a direct biodegradable component, an oxidizable component, a transition metal component, and a non-metal stabilizing component as a synthetic resin material decomposing component to the thermoplastic resin, molding processing is difficult. At the same time, the mechanical strength, water resistance, and chemical resistance that the thermoplastic resin originally exhibits may be reduced.

The present invention has been made in view of such an actual situation. It is an object of the present invention, with respect to a thermoplastic resin, particularly, in a resin molded body mainly polyolefin resin, to provide a method for decomposing a resin molded body and a decomposable resin product, which can decompose the resin molded body without impairing mechanical strength, water resistance, and chemical resistance properties at the time of production completion and without taking a specific disposal means.

The inventors of the present invention, as a result of conducting extensive studies to solve the above-mentioned problems, found that the problems can be solved by applying a decomposition treatment solution containing a plurality of fatty acid metal salts having different oxidation numbers, to the resin molded body by any method of coating, disseminating, spraying, or dipping, thereby completing the present invention.

That is, according to the first aspect of the present invention, there is provided a method for decomposing a resin molded body, which comprises applying a decomposition treatment liquid containing a plurality of fatty acid metal salts having different oxidation numbers by any method of coating, spraying, spraying, or dipping.

According to a second aspect of the present invention, in the method according to the first aspect, metal elements contained in the fatty acid metal salt is a combination of a transition metal element and a rare earth element.

According to a third aspect of the present invention, in the method according to the second aspect, the method for decomposing a resin molded body is characterized in that the transition metal element is manganese and the rare earth element is cerium.

According to a fourth aspect of the present invention, in the method according to any of the first to third aspects, the method for decomposing a resin molded body is characterized in that the fatty acid contained in the fatty acid metal salt is oleic acid.

According to a fifth aspect of the present invention, in the method according to any one of the first to fourth aspects, the method for decomposing a resin molded body is characterized in that the decomposition treatment liquid is diluted with hydrocarbon oil, and the resin is applied by any of coating, disseminating, spraying, or dipping.

Further, according to a sixth aspect of the present invention, in the method according to the first aspect, the method for decomposing a resin molded body is characterized in that the resin molded body contains a thermoplastic resin as a main raw material.

According to a seventh aspect of the present invention, in the method according to the sixth aspect, the method for decomposing a resin molded body is characterized in that the thermoplastic resin is a polyolefin resin.

Further, according to an eighth aspect of the present invention, in the method according to the first aspect, the method for decomposing a resin molded body is characterized in that the resin molded body contains a component of a decomposition treatment liquid.

According to a ninth aspect of the present invention, provided is a degradable resin product characterized in that a decomposition treatment liquid containing a plurality of fatty acid metal salts having different oxidation numbers is applied to the resin molded body by any of coating, disseminating, spraying or dipping.

According to the present invention, it is possible to provide a method for decomposing a resin molded body and a degradable resin product capable of decomposing the resin molded body without impairing mechanical strength, water resistance, and chemical resistance at the time of manufacture completion, as well as without taking any special measure, with respect to a thermoplastic resin, in particular, in a resin molded body containing a polyolefin-based resin as a main raw material.

DETAILED DESCRIPTION OF THE EMBODIMENTS

Hereinafter, the method for decomposing a resin molded product and the degradable resin product of the present invention will be described in detail. First, the plural fatty acid metal salts having different oxidation numbers according to the present invention are defined as compounds in which a fatty acid obtained from an animal or plant-derived oil and fat and a metal (salt) having a different oxidation number are combined, and in this invention, a decomposition treatment liquid containing the plural fatty acid metal salts is attached to the resin molded body by applying the surface of the resin molded body with any method of coating, disseminating, spraying, or dipping to decompose the resin molded body.

The decomposition process according to the present invention is considered to proceed in the following two steps.

Step 1: Using sunlight (ultraviolet rays), heat, oxygen, water or the like as an energy source, the radical component of the fatty acid generated by the catalytic effect of the metal element oxidizes and decomposes the carbon-carbon bond of the resin forming the resin molded body. As a result, the physical properties (strength, elongation) and molecular weight of the resin molded body are reduced.

Step 2: The oxidized low molecular weight compound (e.g., carboxylic acid, alcohols) formed in Step 1 is digested and absorbed by microorganisms in the soil or compost environment. Eventually, it is stored in the body of microorganisms as biomass, and is converted into carbon dioxide and water by metabolic activities such as respiration (microbial decomposition).

In the present invention, the decomposition treatment of step 1 is first started by attaching the decomposition treatment liquid to the resin molded body. The decomposition treatment liquid can be attached to the resin molded body by, for example, applying with a brace brush, a flat brush, a cylinder brush, a roller, a trowel brush, or a disseminating device, an airbrush, a spray can, a handy sprayer, or a sprayer. Further, in order to improve productivity, the decomposition treatment liquid may be directly attached by immersing the resin molded body in a container filled with the decomposition treatment liquid. In particular, when the resin molding body is in the form of a film or sheet, the resin molding body loaded from a loading roller is dipped into the decomposition treatment liquid in the container, so that the decomposition treatment liquid adheres and that the winding roller winds up the film or sheet as a matter of course.

Alternatively, the decomposition treatment liquid may be attached to the resin molded body on the entire surface of the resin molded body or only on a part of the surface of the resin molded body. By controlling the area where the decomposition treatment liquid adheres to the surface of the resin molding, the completion time of the decomposition treatment can be accelerated or, conversely, delayed, which makes it possible to provide degradable resin products for a wide range of use purposes. In addition, since the present invention is a form in which the decomposition treatment liquid is adhered to the resin molded body of a substantially finished product, it is advantageous for the present invention not to impair the mechanical strength, water resistance, and chemical resistance of the resin molded body.

Examples of the metal element contained in the fatty acid metal salt according to the present invention include combination of any transition metal element such as, e.g., titanium, vanadium, chromium, manganese, iron, cobalt, nickel, copper, zinc, zirconium, niobium, molybdenum, technetium, ruthenium, palladium, silver, and cadmium, and of any rare earth metal element such as, e.g., scandium, yttrium, lanthanum, cerium, praseodymium, neodymium, promethium, samarium, europium, gadolinium, terbium, dysprosium, holmium, erbium, thulium, ytterbium, and lutetium.

There is no limitation as long as a different oxidation number exists when presenting as a salt, and the content ratio of a transition metal element and a rare earth metal element can be arbitrarily set.

As a preferable combination of a transition metal element and a rare earth metal element, a combination of a transition metal element of manganese (oxidation number: divalent and trivalent) and a rare earth metal element of cerium (oxidation number: trivalent and tetravalent) may be exemplified.

The fatty acid contained in the fatty acid metal salt according to the present invention is, for example, a long-chain fatty acid having twelve or more carbon atoms, and exemplified are a saturated fatty acid or an unsaturated fatty acid, such as, e.g., lauric acid, myristic acid, pentadecyric acid, and palmitic acid, margaric acid, stearic acid, arachidic acid, henicosic acid, behenic acid, lignoceric acid, serotic acid, montanic acid, melissic acid, myristoleic acid, palmitoleic acid, sapienoic acid, oleic acid, elaidic acid, vaccenic acid, gadoleic acid, eicosenoic acid, erucic acid, and nervonic acid. Among them, oleic acid, which is an unsaturated fatty acid, is preferably used as the fatty acid according to the present invention from the viewpoint of such as reactivity, stability.

Further, the decomposition treatment liquid according to the present invention is applied to a resin molded body after diluting at a predetermined dilution rate using petroleum carbonized oil such as mineral oil, highly produced base oil, high viscosity index base oil, and chemically synthesized oil. It is preferable to adhere by any method of spraying, spraying, or dipping. The decomposition treatment liquid can be attached evenly and uniformly to the resin molded body by using, among those, in particular, liquid paraffin serving as a mineral oil, to dilute each of the fatty acid metal salts to a final concentration of about 10% by weight or less, preferably 5.5% by weight or less. Even where the fatty acid contained in the fatty acid metal salt is a saturated fatty acid, it can be diluted with a petroleum carbonized oil.

The resin forming the resin molded body according to the present invention is not particularly limited, but preferable examples include thermoplastic resins such as, e.g., polyethylene, polypropylene, polybutadiene, acryl, polyacetal, polyamide, polyethylene terephthalate, polycarbonate, polystyrene, polyphenylene sulfide, and polybutylene terephthalate, polyvinyl chloride, ABS resin, AS resin.

Among these, suitable resins are olefin resins such as, e.g., polyethylene including low density polyethylene, medium density polyethylene, high density polyethylene, and linear low density propylene, polypropylene including polypropylene homopolymer, propylene random polymer, and propylene block polymer, and diene-based elastomer including polybutadiene, polyisobrene and hydrogen thereof. These resins may be used alone or in combination of two or more.

Further, the shape of the resin molded body according to the present invention is not particularly limited, and may be any shape such as a sheet shape, a film shape, a block shape, a pellet shape, or a fiber shape. Each molding method suitable for the shape of the resin molded body such as injection molding, extrusion molding, blow molding, vacuum molding, pressure molding, and inflation molding can be adopted. By applying a decomposition treatment liquid containing a plurality of fatty acid metal salts having different oxidation numbers to a resin molded body molded into a predetermined shape by any method of coating, spraying, spraying, or dipping, It can be used as various degradable resin products such as e.g., film sheets, containers, machine parts, pipes, building materials, daily necessities and miscellaneous goods, foam products, specifically, agricultural mulch film, disposable diapers, goods take-out bags, goods packaging bags, vegetable bags, food trays, beverage cups, garbage bags, vegetation nets for civil engineering, plastic drain materials for drainage, imitation plastic bullets for air guns, pigeon balloons, tree protection materials, bags for fungi and plant cultivation.

It should be noted that the present invention does not deny the same use method as the conventional decomposition treatment agent added at the time of manufacturing the resin molded body. That is, in the present invention, it is of course possible that the decomposition treatment liquid is added to the resin molding in advance by adding the decomposition treatment liquid during molding of the resin molding. In this case, it is desirable to add a small amount of the decomposition treatment liquid that does not impair the mechanical strength, water resistance and chemical resistance of the resin molded product during production. In this way, by preliminarily containing the components of the decomposition treatment liquid according to the present invention in the resin molded body, it is possible to expect a synergistic decomposition effect with the decomposition treatment liquid to be attached after production.

Embodiments

The following tests were conducted to verify the decomposition effect of the resin molded body according to the present invention.

Figure 1A:
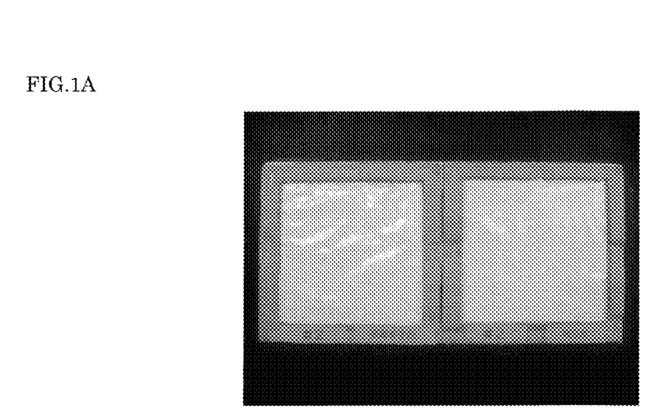
FIG. 1A is a diagram illustrating a change in appearance and a mechanical property (tensile strength and tensile elongation) test of a film coated with a decomposition treatment liquid.
Figure 1B:
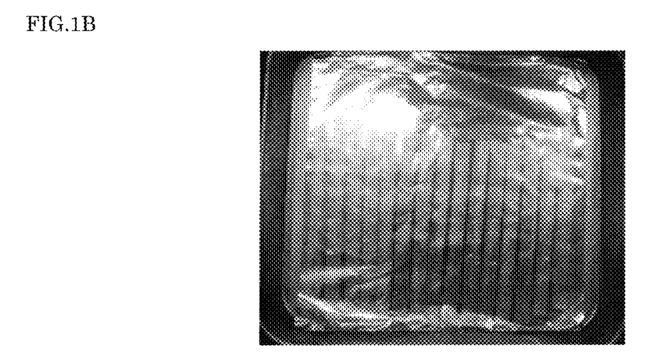
FIG. 1B is a diagram illustrating a change in appearance and a mechanical property (tensile strength and tensile elongation) test of a film coated with a decomposition treatment liquid.

(1) Appearance Observation and Mechanical Property Test of Resin Molded Body after Application of Decomposition Treatment Liquid Shellstone MB80 (Biopoly Joetsu Co.: $CaCo_3$ component 80% by weight, LLDPE (linear low density polyethylene) compound), existing starch biomass resin (rice starch rate 70% by weight) and diluted LLDPE for molding were blended at an arbitrary ratio, and a fatty acid metal salt (A) manganese oleate (30-40% by weight), (B) oleic acid solution containing cerium oleate (10-20% by weight) was diluted with liquid paraffin so that the final concentration of each fatty acid metal salt was about 5.5% by weight and was applied to a film as a resin molded body obtained by inflation molding. After this treatment liquid was applied to the film surface, the film appearance and mechanical properties (tensile strength and tensile elongation) were observed by keeping it in a constant temperature dryer kept at 80 degrees Celsius and protected from light. FIG. 1A shows a sample sheet with a frame for observation, and FIG. 1B shows a set of mechanical property test pieces coated with a decomposition treatment liquid. In FIG. 1A, the decomposition treatment liquid is applied only in the left frame in the drawing, and the decomposition treatment liquid is not applied in the right frame in the drawing.

Table 1 summarizes the composition of the sample used in this test and the mechanical property test results prior to the test.

TABLE 1

| SAMPLE | TIME-VARYING MECHANICAL PROPERTIES | BIOMASS SPECIES AND CONTENT (% BY WEIGHT) | | NO THERMAL HISTORY UNPROCESSED SAMPLE MECHANICAL PROPERTIES | |
| --- | --- | --- | --- | --- | --- |
| | | INORGANIC COMPONENT ($CaCo_3$) | ORGANIC COMPONENT (RICE STARCH) | TENSILE STRENGTH ($kgf/cm^2$) | TENSILE ELONGATION (%) |
| #1 | ○ | 10 | NONE | 177 | 236 |
| #2 | ○ | 20 | NONE | 158 | 251 |
| #3 | ○ | 10 | 10 | 137 | 300 |

(REFERENCE) JIS Z1702 1 TYPE-B
TENSILE STRENGTH STANDARD VALUE: ≥170 $kgf/cm^2$
TENSILE ELONGATION: ≥250%

In this test, prepared were sample #1 (inorganic component: CaCo₃ 10% by weight, organic component: rice starch 0% by weight), sample #2 (inorganic component: CaCo₃ 20% by weight, organic component: rice starch 0% by weight)), and Sample #3 (inorganic component: CaCo₃ 10% by weight, organic component: rice starch 10% by weight). The values of the mechanical properties (tensile strength and tensile elongation) before the test of each sample are as shown in Table 1.

In this mechanical property test, the tensile strength standard value: ≥170 kgf/cm², and the tensile elongation standard value: ≥250% in compliance with JIS Z1702 Type 1B.

Figure 2:
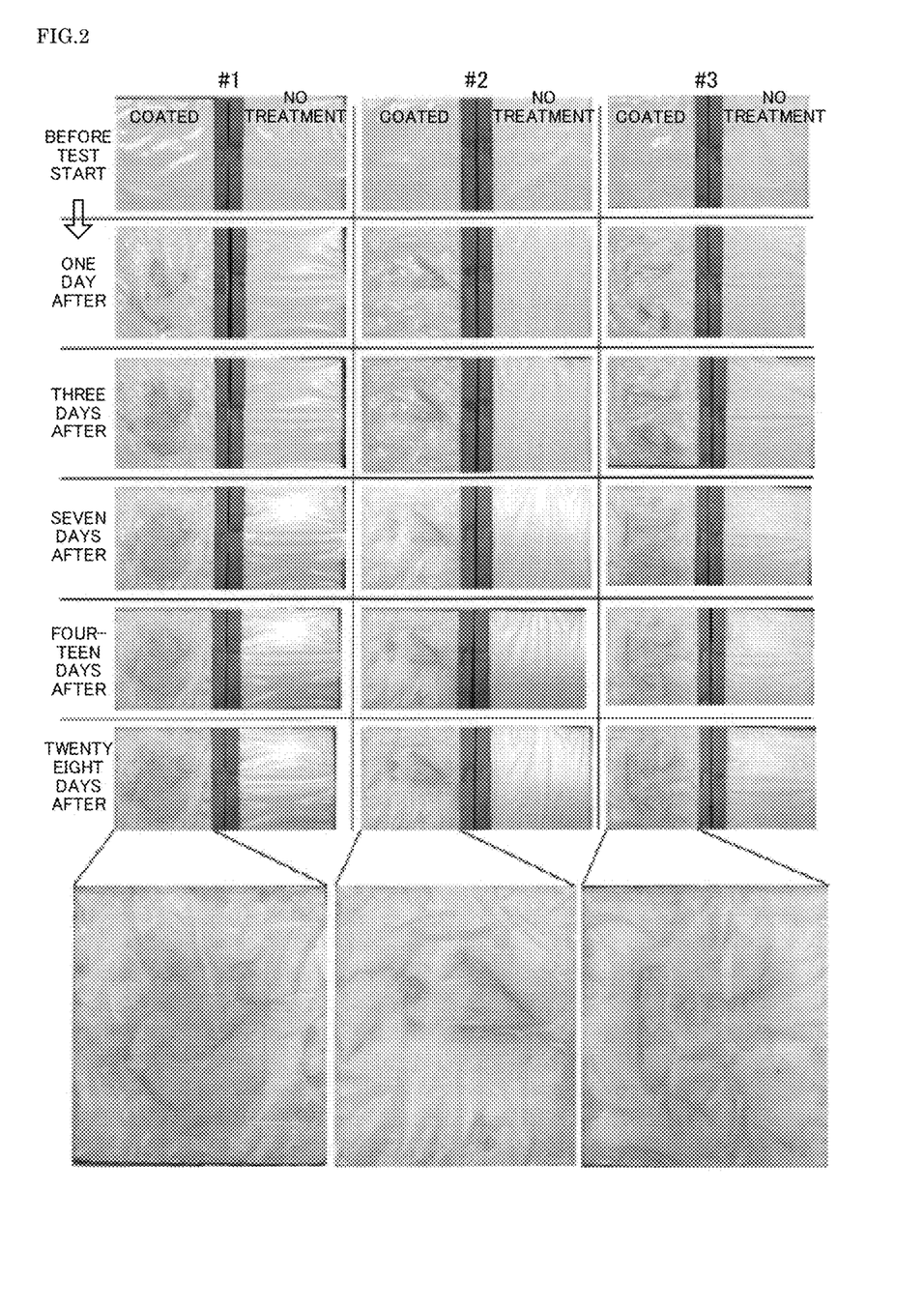
FIG. 2 is a diagram showing a change in appearance of a film coated with a decomposition treatment liquid.

FIG. 2 shows the time-dependent change in film surface deterioration for each of the samples (#1 to #3). As shown in FIG. 2, in all of the samples, it can be seen that the deterioration of the film surface is progressing slightly after 1 day from the start of the test. Then, on the 28th day after the start of the test, it was confirmed that the deterioration range spreads over almost the entire film surface (in particular, sample #3). Since Sample #3 contained 10% by weight of rice starch as an organic component, the degradation range was presumed as expanded because the hydrolysis of the biodegradable material such as amylose was promoted in addition to the oxidative degradation by the degradation solution. In addition, as is clear from the observation result of sample #1, the deterioration of the film surface is surely progressed even if the biodegradable material such as amylose is not contained as in sample #3. It was confirmed that the method for disassembling the resin molded body according to the present invention was useful.

Figure 3A:
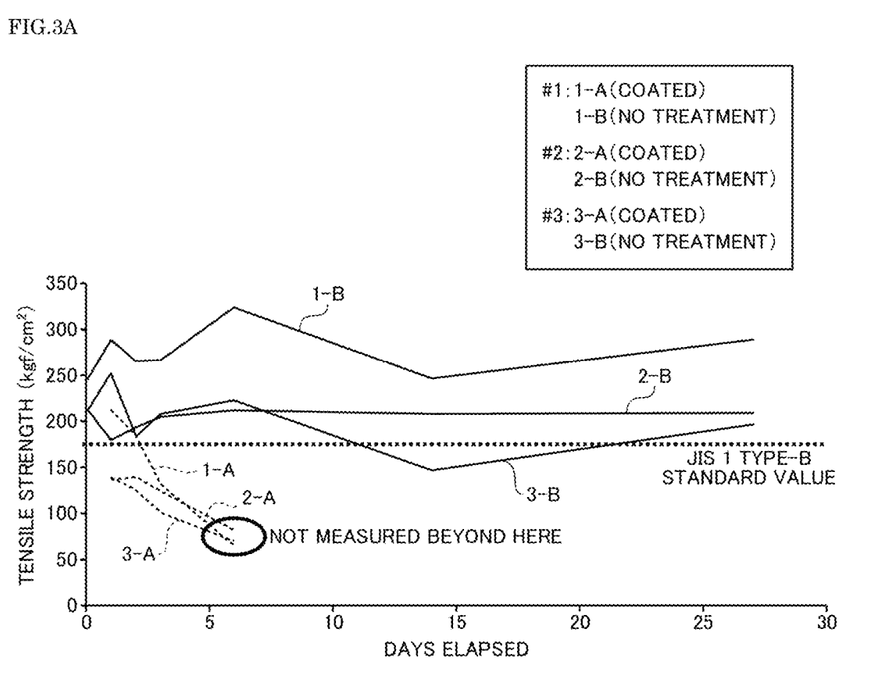
FIG. 3A is a graph showing test results of a mechanical property (tensile strength and tensile elongation) test of a film coated with a decomposition treatment liquid.
Figure 3B:
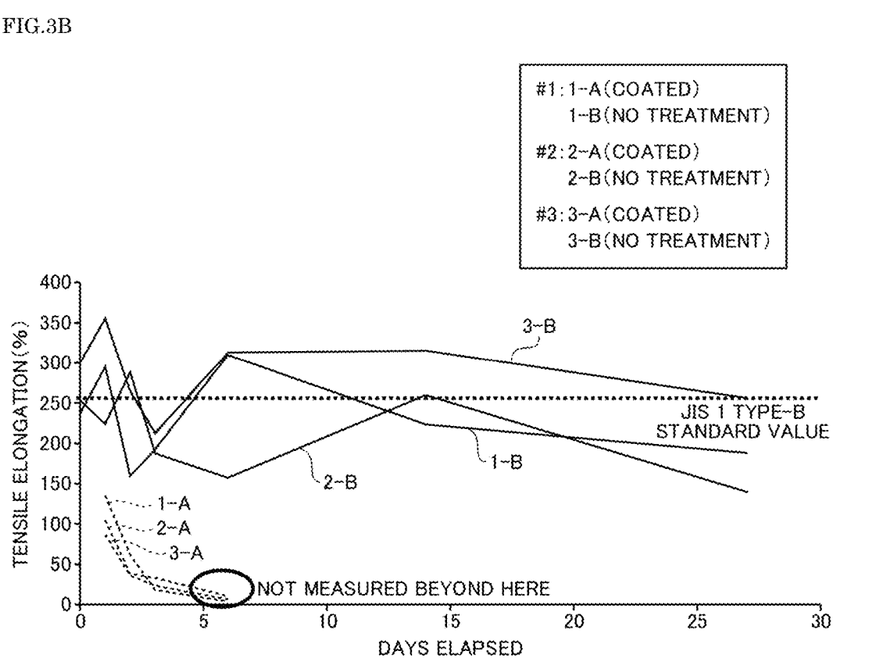
FIG. 3B is a graph showing test results of a mechanical property (tensile strength and tensile elongation) test of a film coated with a decomposition treatment liquid.

FIG. 3A is a graph showing the change over time of the tensile strength of each of the samples (#1 to #3), and FIG. 3B is a graph showing the change over time of the tensile elongation of each of the samples (#1 to #3). In the mechanical property test under constant temperature kept at 80 degrees Celsius with light shielded, as shown by dotted lines 1-A, 2-A, and 3-A in FIGS. 3A and 3B, on the 3rd day from the start of the test, the respective values were far below the JIS standard values. In fact, the sample treated with the decomposition treatment solution one week after the start of the test was so brittle that the test papers shown in FIG. 1B could not be attached to the jig when the mechanical properties were tested. As shown in FIG. 1A or FIG. 2, tears due to shrinkage on the surface of the film were certainly conspicuous.

The sensory (feeling) brittleness is already apparent 24 hours after the start of the test, which means that thermal deterioration (oxidation) decomposition accelerating property due to the application of the decomposition treatment liquid under these conditions occurs in a short time.

(2) Field Test of Resin Molded Product Coated with Decomposition Treatment Liquid As in the above test (1), as fatty acid metal salts, an oleic acid solution containing: (A) manganese oleate (30 to 40% by weight) and (B) cerium oleate (10 to 20% by weight) is diluted with liquid paraffin so that the final concentration of each fatty acid metal salt is about 5.5% by weight. Each of the LDPE (low-density polyethylene) film and the HDPE (high density polyethylene) film was coated with the diluted oleic acid solution, and was spread under an actual soil atmosphere, and it was confirmed whether or not the polyethylene film was decomposed.

As a result of the field test, no change was observed in the morphology of the control polyethylene film to which the decomposition treatment liquid was not applied for 10 days even if the decomposition accelerating means such as UV irradiation and heat application was separately taken.

Figure 4A:
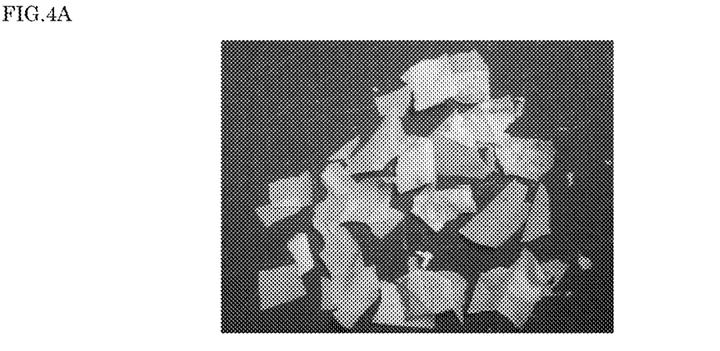
FIG. 4A is a diagram showing test results of a field test of a resin molded body coated with a decomposition treatment liquid.
Figure 4B:
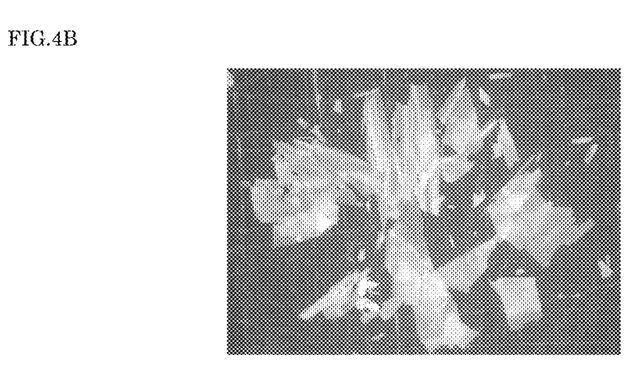
FIG. 4B is a diagram showing test results of a field test of a resin molded body coated with a decomposition treatment liquid.

On the other hand, regarding the polyethylene films coated with the decomposition treatment liquid, as shown by the test results of the HDPE film of FIG. 4A and the LDPE film of FIG. 4B, the polyethylene films coated with decomposition treatment solution become very brittle in two days after the start of the testing, so that the usefulness of the method for decomposing a resin molded body according to the present invention was confirmed.

From the above results, according to the present invention, it is possible to provide a method for decomposing a resin molded body and a degradable resin product capable of decomposing the resin molded body formed of a thermoplastic resin, in particular, in a resin molded body of the polyolefin resin as a main raw material, without impairing the mechanical strength, water resistance, chemical resistance at the time of completion of manufacturing, and without taking a specific disposal means.

Further, since the present invention is a mode in which the decomposition treatment liquid is attached to the resin molded body of a substantially finished product, the manufacturing process of the degradable resin product can be simplified and the manufacturing cost can be suppressed. Furthermore, by adjusting the adhesion area of the decomposition treatment liquid to the surface of the resin molding and the concentration of the fatty acid metal salt content in the decomposition treatment liquid, it is possible to easily control the decomposition rate by accelerating the completion time of the decomposition treatment or vice versa, and therefore, it is possible to provide degradable resin products for a wide range of purposes (fields).

What is claimed is:

1. A method for decomposing a resin molded body, comprising:
    applying a decomposition treatment liquid containing a plurality of fatty acid metal salts having different oxidation numbers by any method of coating, disseminating, spraying or dipping;
    wherein metal elements contained in the fatty acid metal salt are a combination of a transition metal element and a rare earth element.

2. The method for decomposing a resin molded body according to claim 1, wherein the transition metal element is manganese whereas the rare earth element is cerium.

3. The method for decomposing a resin molded body according to claim 1, wherein the fatty acid contained in the fatty acid metal salt is oleic acid.

4. The method for decomposing a resin molded body according to claim 1, wherein the decomposition treatment liquid is diluted in a hydrocarbon oil, and is applied by any method of coating, disseminating, spraying or dipping.

5. The method for decomposing a resin molded body according to claim 1, wherein the resin molded body is made of a thermoplastic resin as a main raw material.

6. The method for decomposing a resin molded body according to claim 5, wherein the thermoplastic resin is a polyolefin based resin.

7. The method for decomposing a resin molded body according to claim 1, wherein the resin molded body contains a component of the decomposition treatment liquid.

8. A degradable resin product, comprising: a decomposition treatment liquid containing a plurality of fatty acid metal salts having different oxidation numbers applied to a resin molded body by any of coating, disseminating, spraying or dipping;

wherein metal elements contained in the fatty acid metal salt are a combination of a transition metal element and a rare earth element.

9. A method for decomposing a resin molded body containing a thermoplastic resin as a main raw material, comprising:

applying a decomposition treatment liquid containing manganese oleate and cerium oleate as a plurality of fatty acid metal salts having different oxidation numbers by any method of coating, disseminating, spraying or dipping.

10. The method for decomposing a resin molded body according to claim 9, wherein the decomposition treatment includes two steps of oxidative decomposition of carbon-carbon bonds in the resin to form low molecular weight compounds, and microbial decomposition of the low molecular weight compounds.

11. A degradable resin product, comprising: a decomposition treatment liquid containing manganese oleate and cerium oleate as a plurality of fatty acid metal salts having different oxidation numbers applied to a resin molded body containing a thermoplastic resin as a main raw material by any of coating, disseminating, spraying or dipping.

* * * * *